Figure 1:
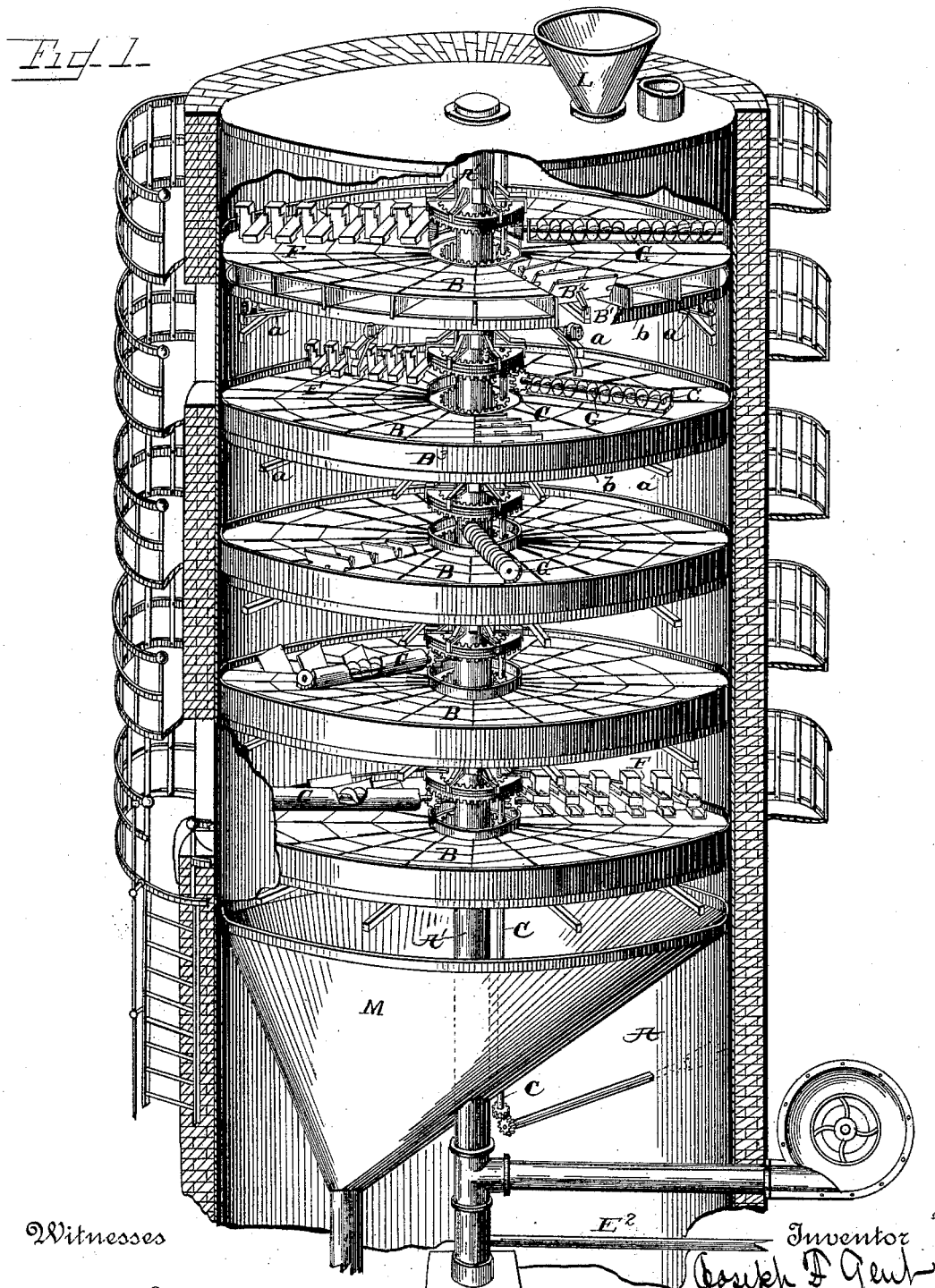

(No Model.) 6 Sheets—Sheet 1.

J. F. GENT.
MALTING AND GERMINATING APPARATUS.

No. 409,956. Patented Aug. 27, 1889.

Witnesses
Inventor
Joseph F. Gent
By his Attorneys

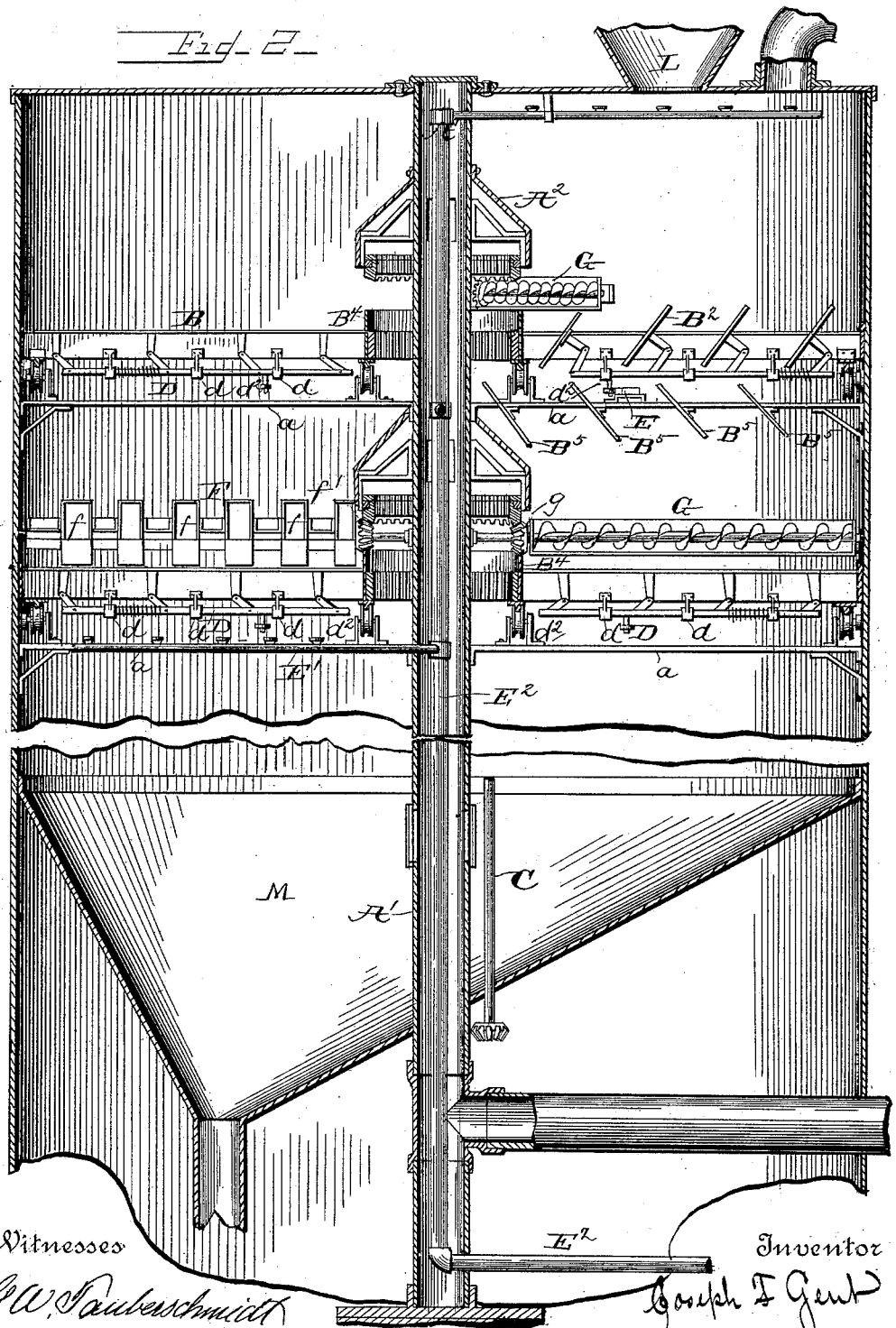

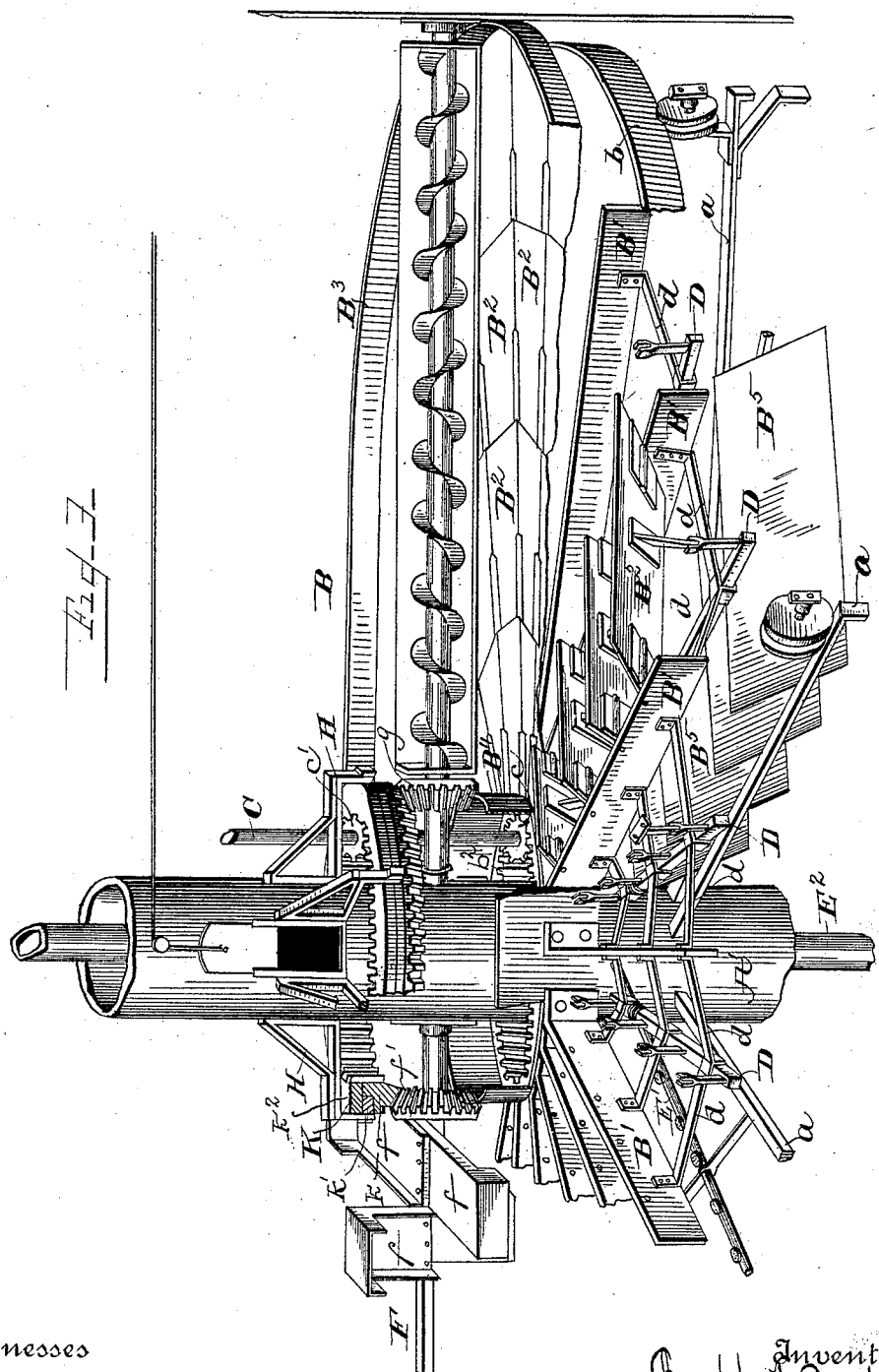

(No Model.) 6 Sheets—Sheet 4.
J. F. GENT.
MALTING AND GERMINATING APPARATUS.
No. 409,956. Patented Aug. 27, 1889.
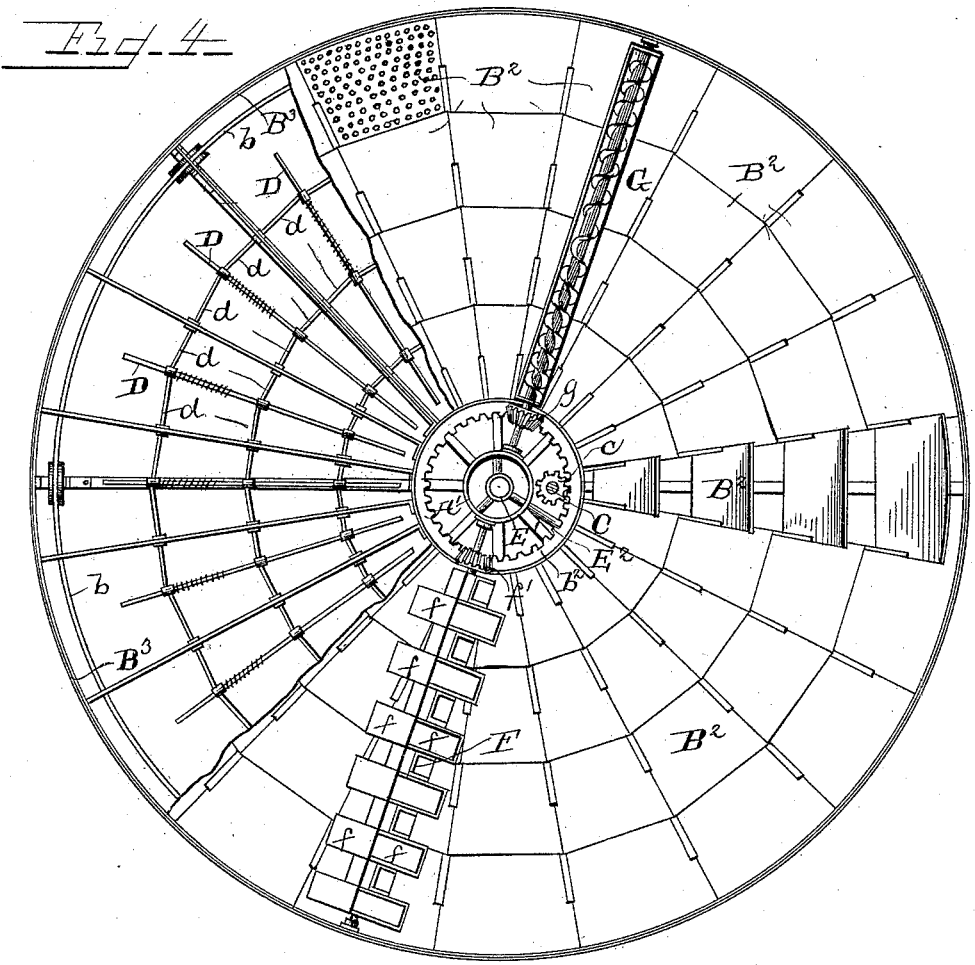
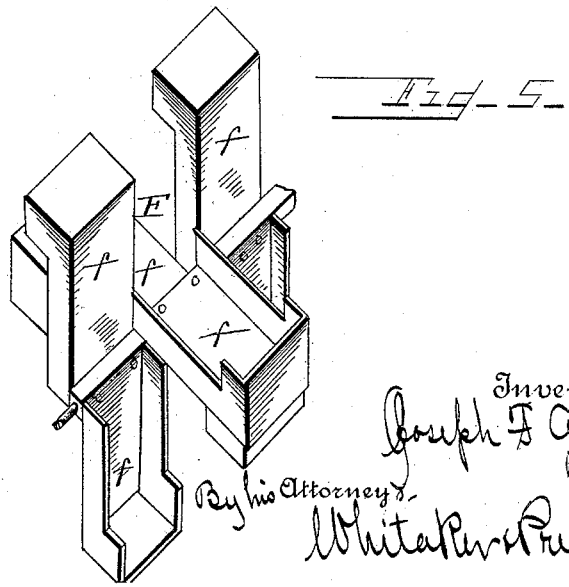
Witnesses
Inventor (No Model.) 6 Sheets—Sheet 5.
J. F. GENT.
MALTING AND GERMINATING APPARATUS.
No. 409,956. Patented Aug. 27, 1889.
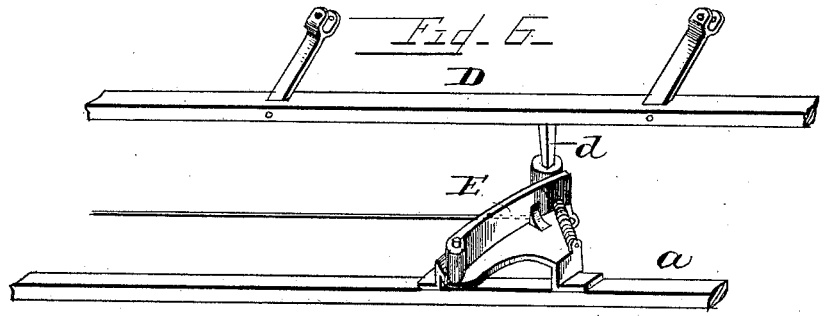
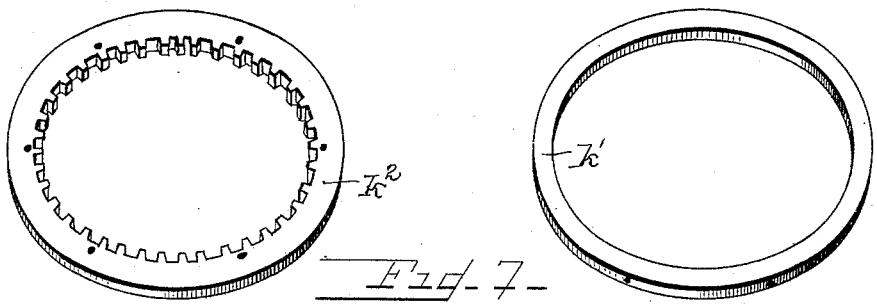
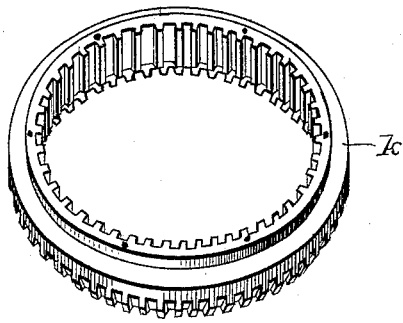
Witnesses
Inventor
Joseph F Gent
By his Attorneys (No Model.) 6 Sheets—Sheet 6.
J. F. GENT.
MALTING AND GERMINATING APPARATUS.
No. 409,956. Patented Aug. 27, 1889.
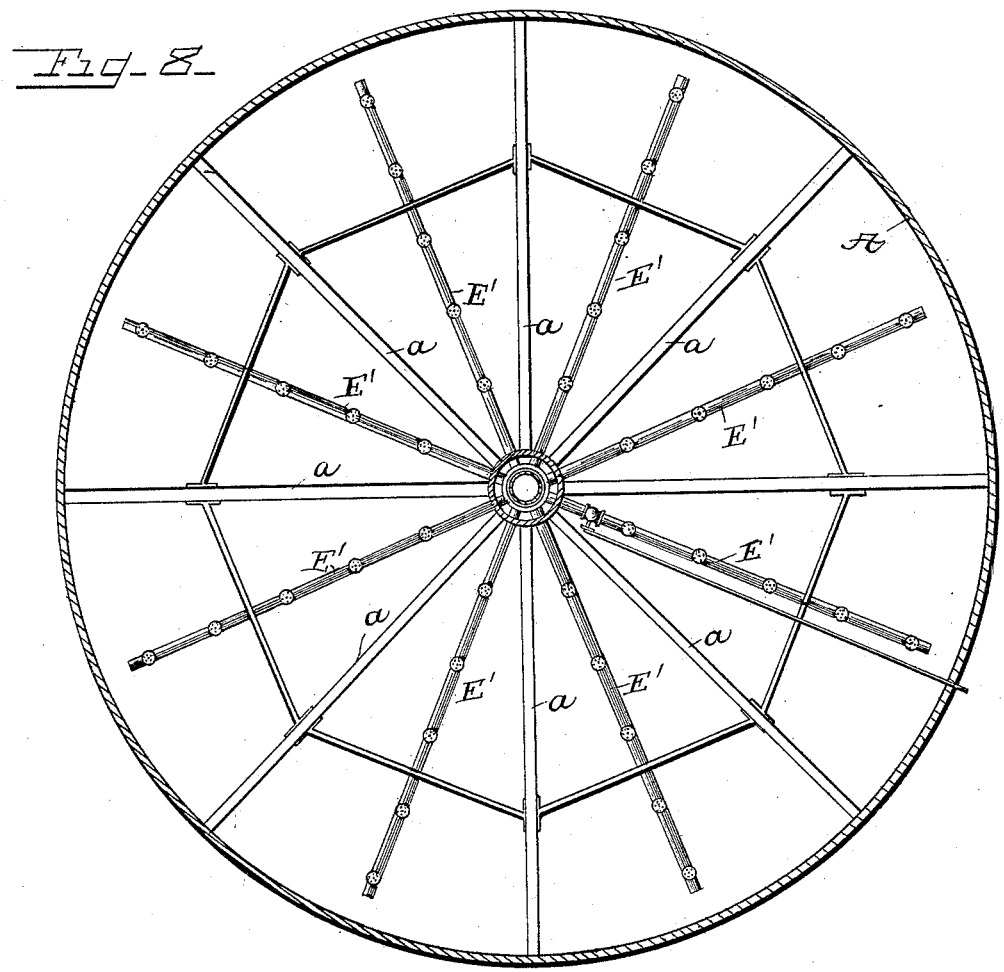
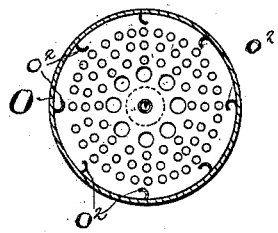
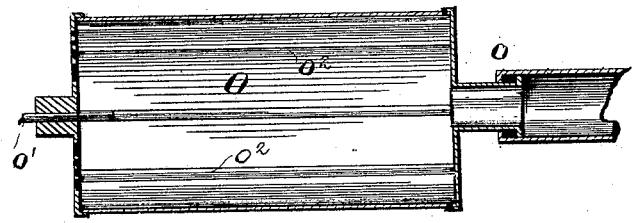
Witnesses
G. A. Tauberschmidt
L. B. Whitaker
Inventor
Joseph F. Gent
By his Attorney
Whitaker & Prevost

UNITED STATES PATENT OFFICE.

JOSEPH F. GENT, OF COLUMBUS, INDIANA.

MALTING AND GERMINATING APPARATUS.

SPECIFICATION forming part of Letters Patent No. 409,956, dated August 27, 1889.

Application filed March 19, 1889. Serial No. 303,894. (No model.)

*To all whom it may concern:*

Be it known that I, JOSEPH F. GENT, a citizen of the United States, residing at Columbus, in the county of Bartholomew and State of Indiana, have invented certain new and useful Improvements in Malting and Germinating Apparatus; and I do hereby declare the following to be a full, clear, and exact description of the invention, such as will enable others skilled in the art to which it appertains to make and use the same.

My invention relates to apparatus for the continuous malting or germinating of grain; and it consists in certain improvements in construction and combination of parts, hereinafter fully described.

I have illustrated one form in which I have contemplated embodying my invention in the accompanying drawings, and said invention is fully disclosed in the following specification and claims.

In the said drawings, Figure 1 is a perspective view of an apparatus embodying my invention, the walls being in section and the interior parts being shown in perspective. Fig. 2 is a vertical section of the same. Fig. 3 is a perspective view of a portion of one floor of the apparatus. Fig. 4 is a plan view of one of said floors with a portion of the flooring broken away. Fig. 5 is a perspective view of a portion of one of the stirring devices employed in this apparatus. Fig. 6 is a detail view of the mechanism for automatically dumping the floors. Fig. 7 is a detail view of parts of the mechanism. Fig. 8 is a section of the machine, showing the water-pipes. Figs. 9 and 10 are a cross-section and vertical transverse section, respectively, of a device for moistening and tempering the air supplied to the apparatus.

In the drawings, A indicates the casing of the machine. This casing is circular in cross-section and may be formed of any suitable material, and may have as many floors as desired. I may construct the said casing of metal or masonry, or both, as preferred, and suitable means are provided for affording access to each floor. When made of metal, it is preferably constructed double and the intervening space filled with any suitable non-conducting material. In the center of this machine, rigidly secured in any suitable manner, is a shaft A', which is hollow and formed of sections of pipe of the desired diameter suitably connected.

Each of the floors B of the apparatus is provided with a central aperture somewhat larger than shaft A', as shown in Fig. 4, to admit of the passage of the same, and said floors are supported upon a series of radial arms $a$, suitably secured to the central shaft and to the walls or casing of the machine.

The floors B are provided at or near their peripheries with the depending track $b$, and a similar track $b'$ surrounds the central openings of the floors on the under side of the same. These circular tracks engage supporting-rollers mounted on the radial arms $a$, and support the floors in position to rotate about the shaft A'. I may, however, support the tracks by rollers mounted on brackets suitably attached to the casing A of the machine; or I may provide a stationary track and provide the floors with rollers to engage the same, if desired.

In the apertures surrounding the central shaft are rigidly secured internal gears $b^2$, and motion may be imparted to the same, and thereby to the circular floors B, by means of gears $c$ on a driving-shaft C, which extends vertically through the central apertures of the floors. Each of the floors consists of a framing of radial joists B', between which are pivotally mounted the sections B² of flooring, which are provided with fine perforations. The exterior periphery of the floor is provided with a rim B³, which extends a short distance above the flooring, and a similar rim B⁴ surrounds the central apertures of the floors. Beneath the sections B², and supported by braces from the joists B', are guides $d$, in which are mounted the sliding rods D. The sections B² of flooring are connected to the sliding rods D by any preferred means, so that a longitudinal movement of one of the rods D will cause each section of the flooring above the same to tilt on its pivotal axis, as best seen in Fig. 3. A spring, weight, or other preferred means is interposed between the rod D and one of the guides $d$ and holds the said rod normally in position with the flooring-sections in a horizontal position. The said springs or other devices will return said rods and sections to their normal positions after the sections have been tilted to dump the material upon them. I prefer to provide a construction for dumping these series of sections automatically; and to this end I mount upon some stationary portion of the frame, as upon one of the radial arms $a$, a cam E, adapted to be engaged by a friction-roller $d^2$, mounted on an arm depending from each of the rods D. This cam is so constructed as to provide an inclined surface to engage the roller $d^2$ and force the rod D to move longitudinally in its guides, thereby dumping the series of sections $B^2$ with which it is connected. As the floor B rotates, the rollers $d^2$ of rods D will successively engage the cam E and dump the series of sections connected with each; hence it will be seen that the entire floor will be dumped by one revolution of the same. I prefer to place the cams E in such relation that each floor below the top will dump at a point in advance of the one above it, thereby providing a clear space for each floor to dump upon, and the material dumped upon a floor will thus remain thereon until the floor has made almost an entire revolution. I may employ any preferred form of cams, and I pivot the same in such a manner that they may be retracted out of the path of rollers $d^2$ by means of connections extending to any convenient point, so that any or all of the floors may be allowed to rotate without dumping, if it is desired.

In order that the material dumped by the sections $B^2$ may be distributed as evenly as possible over the floor beneath, I may provide chutes $B^5$ beneath the said sections adjacent to the dumping-point inclined in a direction opposite to that of the sections when tilted. These chutes $B^5$ may be secured to any stationary part of the frame of the apparatus, as the arms $a$, or they may be secured to the joists of the floors or wherever found most convenient and effective.

I provide each floor of the apparatus with one or more water-pipes E', which may extend radially and be supported in any suitable manner from the arms $a$, or other stationary portion of the frame-work. These pipes have a suitable number of sprayers or sprinklers attached to the same at suitable intervals, as best seen in Fig. 8, the object of such pipes and sprinklers being to furnish moisture to the grain in an even and uniform manner. These pipes E' are supplied with water from a pipe $E^2$, which may extend up through the central apertures of the floors, or may pass through the central shaft A', as desired.

Upon each floor of the apparatus I provide one or more stirrers F and levelers G. I prefer to employ one each of these devices for each floor, and to locate them on each floor a little in advance of their positions on the preceding one. I may, however, dispense with the stirring device where found convenient or desirable, as shown on the second floor of Fig. 1. These devices are mounted upon shafts which rotate in bearings attached to the wall or casing of the machine and to the central shaft A at a suitable distance above the floors, and are provided near their inner ends with gears $f'$ and $g$, respectively.

Upon the central shaft A', at a suitable distance above each of the floors B, are attached brackets H, which support an internal gear or annulus K. This gear K is preferably composed of sections one of which is a base $k$, having gear-teeth upon its lower face in addition to its internal gear-teeth, and provided on the inner edge of its upper face with an upwardly-projecting annular flange or ring. Upon this base portion and surrounding the projecting flange is a plain ring $k'$, which is equal in thickness to the said flange, and upon these is placed the top ring $k^2$, which is provided with internal gear-teeth registering with those of the base or ring $k$, and which is secured thereto, preferably, by means of screws passing through the flange of the said base portion, thus leaving the internal gear K free to turn on the ring $k'$. This central ring $k'$ is rigidly attached to the brackets H, before mentioned, and these devices form what I term the "gear-ring supports," and this construction supports the internal gear K in such a manner as to permit it to rotate on the central ring $k'$. The brackets H are placed at such a height above the floor that the bevel gear-teeth on the lower face of the internal gear engage the gears $f'$ upon the shafts which support the stirrers and levelers. I may, however, construct the said internal gear with gear-teeth upon its upper face and support it below the gears $f'$ and $g$ and engaging the same. The internal teeth of gear K are engaged by a gear $c'$ on the power-shaft C, and the operation of said shaft will cause the said gear to revolve, thereby rotating the stirrer F and leveler G. This stirrer may be of any preferred construction. I have shown it as composed of two series of angular scoops $f$, each series consisting of scoops attached to the shaft on opposite sides of the same and extending outwardly in opposite directions, the scoops of one series being at right angles to the scoops of the other series, so that the action of the stirrer is continuous. As the shaft is rotated, the outer ends of the scoops will descend into the material and raise a portion of it, which upon a further rotation of the shaft will be discharged freely along the main body of the scoop upon the opposite side of the shaft, thereby effectively stirring the material.

The shell or casing of my improved leveler G extends the entire distance between the rims $B^3$ and $B^4$, and consists, preferably, of a portion of a cylinder. This shell is provided with end pieces, through which pass the shaft of a right and left conveyer, and the shell is suitably attached to some fixed portion of the frame and held rigidly in position, so that it does not rotate with the conveyer. The right and left conveyer are joined at or near the center of the shaft, and will feed the material in the shell or casing from the center of the same toward the ends, and said conveyer will be actuated by means of the gear $g$ from the internal gear K. As the floor and its contents pass beneath the leveler, the material will be spread evenly over the floor, the excess entering the shell and being conveyed to another portion of the same before being forced out by fresh material. I may employ a conveyer feeding in one direction only, if desired, as shown in Fig. 2.

At some convenient point at or near the top of the machine is a hopper L, through which the material may be introduced into the machine, and below the lowest floor I provide a hopper M, having the diameter of its upper portion equal to or greater than that of the floor above it to receive the grain, whence it may be delivered to any convenient point.

As before stated, the shaft A' is hollow and serves as a means of supplying air to the different floors. For this purpose apertures are formed in the shaft at different points—one or more for each floor—and means are provided for governing the said apertures from some convenient point, as indicated in Fig. 3, in which said apertures are shown as provided with sliding covers N, adapted to be operated by suitable connecting cords or chains.

I also provide the machine with an aperture near the top for the exit of the air, which may be forced into the central shaft by any suitable means, a rotary fan being shown, and the opening in the top of the apparatus may be connected with an exhaust, if desired, to create a suitable draft.

I also provide the device shown in Figs. 9 and 10 for moistening and tempering the air before it is admitted to the fan or other device for supplying air to the machine. This device consists of a hollow cylinder O, which is provided with trunnions and supported in bearings in such a manner that it may be rotated. The interior of the cylinder is provided with projecting ribs or flanges $o^2$, extending longitudinally of the cylinder, and said flanges may be either curved or straight in cross-section. The trunnions are hollow and communicate with the interior of the cylinder, and one of said trunnions is connected with the inlet-pipe $o$ of the fan or other air-forcing device. The other trunnion is connected with a water-pipe $o'$, which extends through the same and discharges within the cylinder. The head of the cylinder adjacent to the water-pipe is provided with apertures for the admission of air, and the walls of the cylinder at or near its other extremity with suitable outlet-apertures for the exit of the water admitted through the said water-pipes $o'$. In operation this cylinder O is filled with charcoal or other porous material and the device rotated. Water of the desired temperature is admitted through the water-pipe $o'$ and percolates through the charcoal to the other end of the cylinder, where it passes out through the apertures provided for the purpose. When the fan or other air-forcing device is in operation, the suction will draw the air through the apertures in the head of the cylinder into the interior of the same, where it comes in contact with the moistened charcoal, is tempered, moistened, and purified, and passes through the pipe $o$ to the fan, which forces it into the shaft A', which distributes it to the floors of the machine.

The operation of the machine is as follows: Power is applied to the shaft C, and the floors and stirring and leveling devices are set in motion. The material having been subjected to the usual preparatory steeping is introduced into the machine through the hopper L, Figs. 1 and 2, and falls upon the upper floor, preferably just in rear of the dumping-point of that floor. It will then be taken up by the leveler G as the floor revolves and distributed evenly over the floor by the right and left conveyers, and upon a further rotation it will be stirred and turned over by the stirrer F. Upon still further rotation of the floor the cam E may be allowed to engage the rollers $d^2$ of rods D and dump the series of sections connected with each successively, depositing the material upon the floor below in rear of its dumping-point. Each series of flooring-sections as soon as they are returned to their normal position are refilled from the hopper L, and, as the floor has a continuous rotary movement and the sections are successively dumped just before coming beneath the hopper, the grain upon each series of sections of the floor is successively deposited upon the floor below and a fresh supply deposited upon such sections immediately thereafter. The sections of each floor are operated in alike manner, so that the operation is continuous throughout the entire machine, the material being introduced through the hopper L and discharged through the hopper M at the bottom of the machine.

During the passage of the grain through the machine it is subjected to the action of air tempered and moistened, as before described, by any of the well-known devices employed for this purpose. In this instance the cylinder O is shown and described as being employed by me. The air may be admitted to the apparatus beneath each floor, and will then pass upward through the perforated flooring-sections $B^2$ and through the grain, or it may be admitted above each floor through the openings in the shaft A', or it may be admitted above and below the said floors, as found most convenient and effective.

The grain upon each floor is furnished with moisture by means of the pipes E', and means are provided whereby the supply of moisture may be cut off from any or all of the floors, if desired; or I may dispense with these pipes in some instances if found unnecessary.

I prefer to provide suitable mechanism— such as a cone-pulley, as indicated in Fig. 1 in dotted lines, or other speed-gearing—for regulating the speed of the shaft C and the floors, and by means of these devices the floors can be made to move at such a speed that when the grain is discharged it will be in the condition desired. The devices for imparting motion will also be such that the floors may be stopped at any point and permitted to remain stationary as long as desired to complete the malting or germinating when it is found necessary or desirable.

If found desirable, the cams of all the floors, or any of them, may be retracted and the material allowed to remain longer upon one or more of the floors before being dumped.

The stirring and leveling devices serve to agitate the material and stir it so that every portion will be exposed to the action of the air and moisture, and I may provide the sections $B^2$ of the flooring with fine perforations, which will allow the air to pass up through them.

I may provide a hood or apron $A^2$, to serve as a covering for the central aperture of each floor and the gearing situated adjacent thereto. This hood or apron will protect the mechanism surrounding the apertures and provide an inclined surface to guide all material falling thereon to the floor.

What I claim, and desire to secure by Letters Patent, is—

1. An apparatus for malting or germinating grain, consisting of an outer casing, a series of perforated floors one above the other, provided with automatically-dumping sections, said floors having each a central aperture, an air-supplying pipe extending through said apertures and provided with apertures to discharge air beneath each of said floors, a shaft for rotating said floors, also extending through said openings, and a water-pipe extending within said openings and provided with a discharge above each floor, substantially as described.

2. An apparatus for malting or germinating grain, consisting of perforated floors one above the other, having central apertures in each, a shaft for revolving said floors extending vertically through said apertures, and a water-supply pipe extending also vertically through said apertures and having a spraying-discharge above each floor, the said floors having pivoted automatically-dumping sections, the dumping-point of each floor being a short distance in advance of the dumping-point of the floor above, substantially as described.

3. An apparatus for malting or germinating grain, consisting of an inclosing-casing, revolving perforated floors one above the other, an air-pipe extending centrally through said floors and having a discharge-opening beneath each floor, an air-forcing and air-moistening device communicating with said pipe, a water-supply pipe extending within said air-pipe and provided with a spraying-discharge above each floor, and stirring and leveling devices above each floor, the said floors being provided with pivoted automatically-dumping sections, the dumping-point of each floor being slightly in advance of the floor above, substantially as described.

In testimony whereof I affix my signature in presence of two witnesses.

JOSEPH F. GENT.

Witnesses:
L. B. WHITAKER,
J. H. WHITAKER.